US012769640B2

(12) United States Patent
Maghnani et al.

(10) Patent No.: US 12,769,640 B2
(45) Date of Patent: Oct. 20, 2026

(54) DYNAMIC APPLICATION PROGRAMMING INTERFACE VALIDATION SYSTEM

(71) Applicant: Bank of America Corporation, Charlotte, NC (US)

(72) Inventors: Vinod Maghnani, Haryana (IN); Veena Bhatia, Gurugram (IN); Sheetal Bhatia, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 195 days.

(21) Appl. No.: 18/596,295

(22) Filed: Mar. 5, 2024

(65) Prior Publication Data

US 2025/0284619 A1 Sep. 11, 2025

(51) Int. Cl.
*G06F 11/3668* (2025.01)

(52) U.S. Cl.
CPC ...... *G06F 11/3684* (2013.01); *G06F 11/3692* (2013.01)

(58) Field of Classification Search
CPC .......................... G06F 11/3684; G06F 11/3692
USPC ................................ 717/124–140; 706/25–45
See application file for complete search history.

(56) References Cited

U.S. PATENT DOCUMENTS

| | | | | |
|---|---|---|---|---|
| 7,328,134 | B1 * | 2/2008 | Burbidge, III | G06F 11/3688 702/186 |
| 9,886,247 | B2 | 2/2018 | Laredo et al. | |
| 10,133,650 | B1 * | 11/2018 | Park | G06F 11/3684 |
| 10,169,211 | B2 | 1/2019 | Kruglick | |
| 10,740,164 | B1 | 8/2020 | Roy et al. | |
| 10,740,215 | B2 | 8/2020 | Lowe et al. | |
| 11,347,631 | B1 * | 5/2022 | Merritt | G06F 11/3692 |
| 11,403,558 | B1 | 8/2022 | Shorter et al. | |
| 11,514,448 | B1 * | 11/2022 | Liberman | G06Q 20/389 |
| 11,520,688 | B1 * | 12/2022 | Poirier | G06F 11/3684 |
| 11,768,758 | B2 | 9/2023 | Saha et al. | |
| 11,868,242 | B1 * | 1/2024 | Merritt | G06F 11/3692 |
| 11,907,109 | B2 | 2/2024 | Wang et al. | |

(Continued)

OTHER PUBLICATIONS

Ahmed et al, "Artificial Intelligence for Soware Engineering: The Journey So Far and the Road Ahead", ACM, pp. 1-28 (Year: 2025).*

(Continued)

*Primary Examiner* — Anil Khatri
(74) *Attorney, Agent, or Firm* — Banner & Witcoff, Ltd.

(57) ABSTRACT

Various aspects of the disclosure relate to automated testing for application programming interfaces (APIs). A dynamic API validation computing system leverages a generative AI model to dynamically generate a multitude of data sets and rules for use during API validation activities. A federated byzantine agreement mechanism performs the validation of each API using the generated test cases and test data. A generator engine incorporates a generative AI model that may be trained on a large corpus of API metadata and/or data characteristics to predict data patterns and/or validation rules for each of the APIs under test. The generator engine may also predict a structure and format of requests based on the training model inputs. Multiple Test cases for an API created through use of the generative AI model may be distributed and executed on different testing nodes that reach a consensus about whether each API has passed or failed.

17 Claims, 10 Drawing Sheets

(56) References Cited

U.S. PATENT DOCUMENTS

| | | | | |
|---|---|---|---|---|
| 11,908,167 | B1 * | 2/2024 | Franco | G06T 7/97 |
| 12,197,859 | B1 * | 1/2025 | Malviya | G06F 40/216 |
| 12,346,820 | B1 * | 7/2025 | Rahman | G06N 3/0895 |
| 12,596,839 | B2 * | 4/2026 | Burns | G06F 21/6245 |
| 2016/0308900 | A1 | 10/2016 | Sadika et al. | |
| 2021/0329075 | A1 * | 10/2021 | Sardesai | H04L 9/3239 |
| 2022/0342801 | A1 | 10/2022 | David et al. | |
| 2023/0289282 | A1 | 9/2023 | Khafizov et al. | |
| 2023/0370250 | A1 | 11/2023 | Sung | |
| 2024/0036947 | A1 | 2/2024 | Ghattu et al. | |
| 2025/0265176 | A1 * | 8/2025 | Singh | G06F 8/20 |

OTHER PUBLICATIONS

Huang, "Frontiers and Challenges of Artificial Intelligence Algorithms in Data Science", IEEE, pp. 1-4 (Year: 2025).*
Freeman et al, "The Impact of Generative AI on Test & Evaluation: Challenges and Opportunities", ACM, pp. 1-5 (Year: 2025).*
Qin et al, "Utilizing Generative AI for VR Exploration Testing: A Case Study", ACM, pp. 1-5 (Year: 2024).*
Russo, "Navigating the Complexity of Generative Al Adoption in Software Engineering", ACM, pp. 1-50 (Year: 2024).*

* cited by examiner

| TestCases | TestCaseType | SvcltmSt | SvcltmId | SvcltmTypCd | SvcltmTypNm |
|---|---|---|---|---|---|
| HAPPY_PATH_TEST1 | VALID_ALL | VALID_ALL | 5795387d-a20c-4c83-826f-b772abba6987 | FRD_CLM | Fraud Claim |
| HAPPY_PATH_TEST2 | VALID_ALL | VALID_ALL | 5adffeaf-f690-4eeb-a673-62da73af8a14 | FRD_CLM | Fraud Claim |
| HAPPY_PATH_TEST3 | VALID_ALL | VALID_ALL | fbe76f3e-f03b-4fe6-a499-4dea115a87f7 | FRD_CLM | Fraud Claim |
| HAPPY_PATH_TEST4 | VALID_ALL | VALID_ALL | 9f4bdf59-cba7-4156-b4ea-2bbfcd8dc63b | FRD_CLM | Fraud Claim |
| HAPPY_PATH_TEST5 | VALID_ALL | VALID_ALL | 96f59383-8cff-475c-9f6f-52bf7f09ce4f | FRD_CLM | Fraud Claim |
| HAPPY_PATH_TEST6 | VALID_ALL | VALID_ALL | 37c81251-f448-451d-bf9c-9f15bd131350 | FRD_CLM | Fraud Claim |
| HAPPY_PATH_TEST7 | VALID_ALL | VALID_ALL | 25d443a8-5aba-4031-96ad-0785b3272ccc | FRD_CLM | Fraud Claim |
| HAPPY_PATH_TEST8 | VALID_ALL | VALID_ALL | 77344442-f7d2-4ad4-ab36-96a46796d926 | FRD_CLM | Fraud Claim |
| HAPPY_PATH_TEST9 | VALID_ALL | VALID_ALL | 1fa7bcf9-1d65-4404-91f3-0ee7d0b20115 | FRD_CLM | Fraud Claim |
| HAPPY_PATH_TEST10 | VALID_ALL | VALID_ALL | 561bc1b7-221e-4700-b953-61ca21151c05 | FRD_CLM | Fraud Claim |
| HAPPY_PATH_TEST11 | VALID_ALL | VALID_ALL | 2727c028-6939-4b42-865b-eea58266edd0 | FRD_CLM | Fraud Claim |
| HAPPY_PATH_TEST12 | VALID_ALL | VALID_ALL | 28771fac-4fcf-4d77-8463-90e694728b82 | FRD_CLM | Fraud Claim |
| HAPPY_PATH_TEST13 | VALID_ALL | VALID_ALL | ff07afd1-e88d-46a1-9ccc-cce8d6e05894 | FRD_CLM | Fraud Claim |
| HAPPY_PATH_TEST14 | VALID_ALL | VALID_ALL | 2f21f737-d8de-4eb1-8eb2-523b74da0190 | FRD_CLM | Fraud Claim |
| HAPPY_PATH_TEST15 | VALID_ALL | VALID_ALL | f845648d-bef1-4796-8ee6-9dffa86e768b | FRD_CLM | Fraud Claim |

⋮

FIG. 6A

| TestCases | ... | SvcItmTypVersnNo | SvcItmDe | SvcItmCtgyDe | SvcItmAsgnCaId | SvcReqCtgyDe | SvcReqTypDe | SvcReqDe | CustNotif | CustNotifTmplUseCas |
|---|---|---|---|---|---|---|---|---|---|---|
| HAPPY_PATH_TEST1 | | 1.001 | NA | Complaint | qE8xh | Complaint | Fraud Claim | Fraud Claim | NA | NA |
| HAPPY_PATH_TEST2 | | 1.001 | NA | Complaint | QUQK3 | Complaint | Fraud Claim | Fraud Claim | NA | NA |
| HAPPY_PATH_TEST3 | | 1.001 | NA | Complaint | DT7DS | Complaint | Fraud Claim | Fraud Claim | NA | NA |
| HAPPY_PATH_TEST4 | | 1.001 | NA | Complaint | vz3Pg | Complaint | Fraud Claim | Fraud Claim | NA | NA |
| HAPPY_PATH_TEST5 | | 1.001 | NA | Complaint | UEJpM | Complaint | Fraud Claim | Fraud Claim | NA | NA |
| HAPPY_PATH_TEST6 | | 1.001 | NA | Complaint | I3YMZ | Complaint | Fraud Claim | Fraud Claim | NA | NA |
| HAPPY_PATH_TEST7 | | 1.001 | NA | Complaint | 29KqE | Complaint | Fraud Claim | Fraud Claim | NA | NA |
| HAPPY_PATH_TEST8 | | 1.001 | NA | Complaint | 9EF80 | Complaint | Fraud Claim | Fraud Claim | NA | NA |
| HAPPY_PATH_TEST9 | | 1.001 | NA | Complaint | sMqaH | Complaint | Fraud Claim | Fraud Claim | NA | NA |
| HAPPY_PATH_TEST10 | | 1.001 | NA | Complaint | Eflcu | Complaint | Fraud Claim | Fraud Claim | NA | NA |
| HAPPY_PATH_TEST11 | | 1.001 | NA | Complaint | 6H39H | Complaint | Fraud Claim | Fraud Claim | NA | NA |
| HAPPY_PATH_TEST12 | | 1.001 | NA | Complaint | DvNLW | Complaint | Fraud Claim | Fraud Claim | NA | NA |
| HAPPY_PATH_TEST13 | | 1.001 | NA | Complaint | Y3IDJ | Complaint | Fraud Claim | Fraud Claim | NA | NA |
| HAPPY_PATH_TEST14 | | 1.001 | NA | Complaint | 18312 | Complaint | Fraud Claim | Fraud Claim | NA | NA |
| HAPPY_PATH_TEST15 | | 1.001 | NA | Complaint | IX60X | Complaint | Fraud Claim | Fraud Claim | NA | NA |

FIG. 6B

| DELEMT_ID | DELEMT_TAG_NM | DELEMT_PLACEHOLDER | DATA_DOMN_NM | DATA_TYP_NM | DELEMT_LNGTH | PRECISION | RQR_FL |
|---|---|---|---|---|---|---|---|
| 1 | serviceItemOrder | REQUEST_PAYLOAD | Structure | Text | | | 1 |
| 2 | serviceItemDataSt | REQUEST_PAYLOAD | Structure | Blob | | | 1 |
| 3 | SvcItmSt | REQUEST_PAYLOAD | Structure | Text | | | 1 |
| 4 | SvcItmId | REQUEST_PAYLOAD | Identifier | Variable Characters | 36 | | 1 |
| 5 | SvcItmTypCd | REQUEST_PAYLOAD | Code | Variable Characters | 20 | | 1 |
| 6 | SvcItmTypNm | REQUEST_PAYLOAD | Name | Variable Characters | 50 | | 1 |
| 7 | SvcItmTypVersnNo | REQUEST_PAYLOAD | Number | Variable Characters | 10 | | 1 |
| 8 | OrdRefNo | REQUEST_PAYLOAD | Number | Variable Characters | 36 | | 1 |
| 9 | SvcItmPrjctFflDt | REQUEST_PAYLOAD | Date | Date | 10 | | 1 |
| 10 | SvcItmFflWndwStrtTmTx | REQUEST_PAYLOAD | Text | Variable Characters | 8 | | 1 |
| 11 | SvcItmFflWndwEndTmTx | REQUEST_PAYLOAD | Text | Variable Characters | 8 | | 1 |
| 12 | SvcItmFeeAm | REQUEST_PAYLOAD | Amount | Decimal | 15 | 2 | 1 |
| 13 | TotSvcItmAm | REQUEST_PAYLOAD | Amount | Float | 15 | 2 | 1 |
| 14 | SvcItmLcsCd | REQUEST_PAYLOAD | Code | Variable Characters | 50 | | 1 |

...

FIG. 7A

| DELEMT_ID | | DELEMT_FORMAT | DELEMT_INVALID_FORMAT | VALID_VALUES | DEFAULT_VAL | SAMPLE_VAL | PARENT_TAG_NM |
|---|---|---|---|---|---|---|---|
| 1 | | | | | | | |
| 2 | | | | | | | serviceItemOrder |
| 3 | | | | | | | serviceItemDataSt |
| 4 | | [A-Za-z0-9]{36} | | | | | SvcItmSt |
| 5 | | [A-Za-z0-9]{20} | | | MLTY_BANK | | SvcItmSt |
| 6 | | [A-Za-z0-9]{50} | | | Military Banking | | SvcItmSt |
| 7 | ... | [0-9][0-9][0-9].[0-9][0-9][0-9] | [0-9]{2} | | 001.001 | | SvcItmSt |
| 8 | | [0-9]{36} | | | | | SvcItmSt |
| 9 | | MM/dd/yyyy | MM-dd-yyyy | | | | SvcItmSt |
| 10 | | (0[1-9]\|1[012]):[0-5][0-9] (AM\|PM) | [0-9]{2} | | | | SvcItmSt |
| 11 | | (0[1-9]\|1[012]):[0-5][0-9] (AM\|PM) | [A-Za-z]{10} | | | | SvcItmSt |
| 12 | | [1-9]{1,12}([.][1-9]{1,2})? | [A-Za-z]{10} | | | | SvcItmSt |
| 13 | | [1-9]{1,12}([.][1-9]{1,2})? | [A-Za-z]{10} | | | | SvcItmSt |
| 14 | | [A-Za-z0-9]{36} | | ACCEPTED, IN_PROGRESS, COMPLETED,CANCELED | | ACCEPTED | SvcItmSt |

FIG. 7B

DYNAMIC APPLICATION PROGRAMMING INTERFACE VALIDATION SYSTEM

BACKGROUND

Aspects of the disclosure relate to computer hardware and software. In particular, one or more aspects of the disclosure generally relate to computer hardware and software for dynamically validating application programming interfaces (APIs) using dynamic data and rules generation through federated byzantine agreement (FBA) analysis and generative artificial intelligence (AI) generated test cases.

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage how internal computer systems exchange information with external computer systems in providing and/or supporting different products and services offered by the organization.

A service provider application, typically supports a suite of APIs for performing create, read, update, and delete (CRUD) functions like publishing, updating, look up, and inquiry of data, such as for a business function, service, and/or computer-based product. Multiple enterprise systems or clients interact with these APIs where each client has a varying and complex API metadata requirement. As such, API validation is exhaustive, cumbersome, and error prone. Occasionally, new metadata may be added for new and/or the existing clients, which increases the complexity of the tests and introduces new error paths that may not be caught with testing. Rules test plans and/or data for current API tests are generated manually or may be only partially automated. As such, current API tests often fail to yield comprehensive test coverage that increases the scope of errors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes dynamically generating test cases and/or test data using generative AI trained on enterprise functionality and using federated byzantine agreement functionality to perform validation tests using the generated test cases and test data.

The dynamic API validation computing system is an intelligent apparatus that leverages a Generative AI model to dynamically generate a multitude of data sets and rules for use during API validation activities. A federated byzantine agreement (FBA) mechanism is used to perform the validation of each API using the generated test cases and test data. A generator engine incorporates a generative AI model that may be trained on a large corpus of API metadata and/or data characteristics to predict data patterns and/or validation rules for each of the APIs under test. The generator engine may also predict a structure and format of requests based on the training model inputs. For example, a generative AI rules engine creates a wide spectrum of test cases for each API, providing a comprehensive test coverage. Multiple Test cases for an API created through use of the generative AI model may be distributed and executed on different testing nodes. Participating nodes must reach a consensus to evaluate whether the execution of each test case has either passed or failed. A "consensus algorithm" through FBA is a process used here to achieve agreement on one or more test cases among distributed processes or systems. The consensus algorithm may be designed to achieve reliability in this validation system involving multiple sources for dynamic data and rules.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 (comprising FIGS. 6A and 6B) shows illustrative training data and predictive output of a generative predictive model in accordance with one or more aspects described herein; and FIG. 7 (comprising FIGS. 7A and 7B) shows illustrative test case output of the generative predictive model in accordance with one or more aspects described herein.

DETAILED DESCRIPTION

Figure 1A:
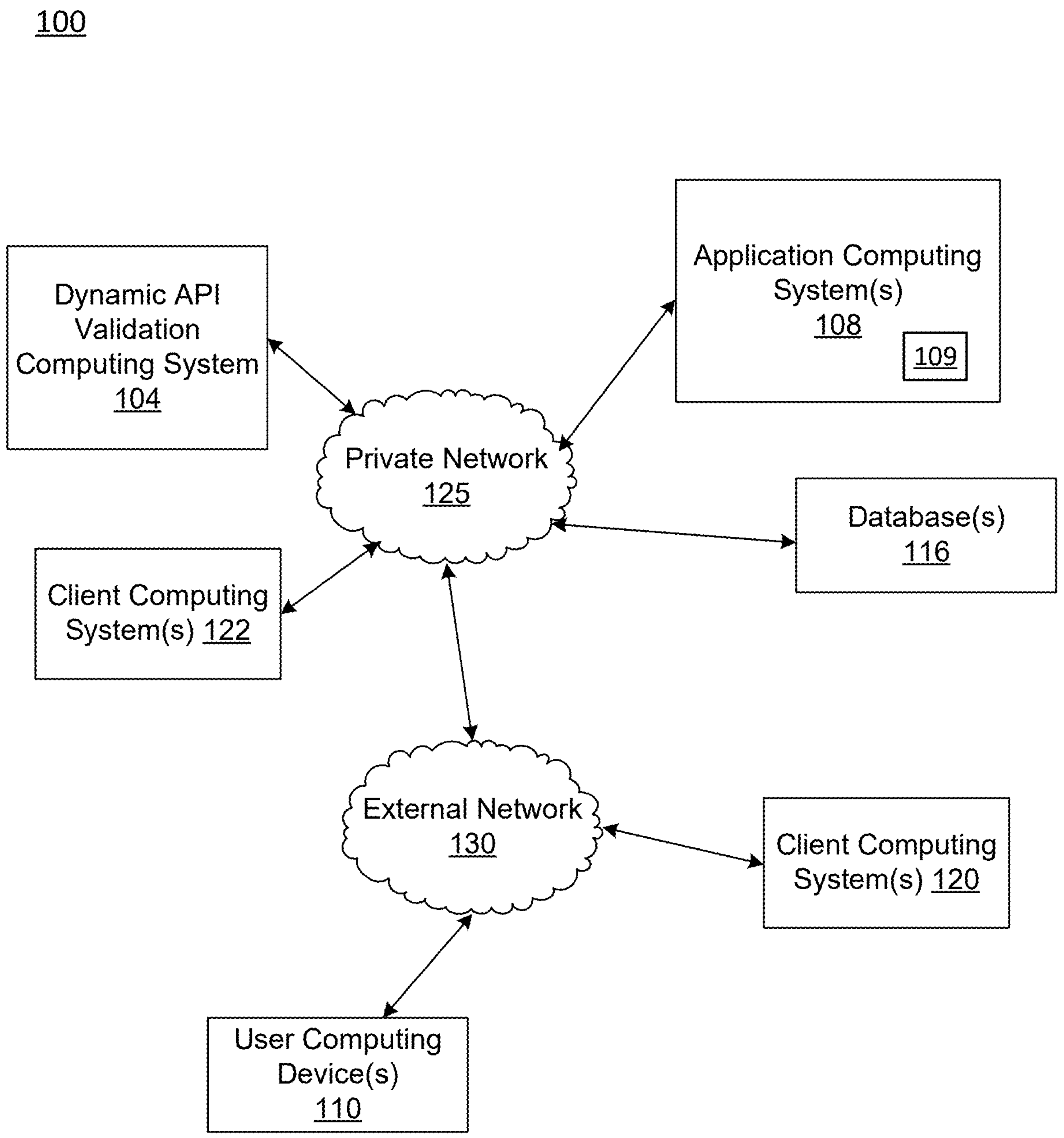
FIG. 1A shows an illustrative computing environment for dynamic generation of application programming interface (API) test cases and test data and performance of validation testing, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

The intelligent API validation apparatus captures API information using multiple methods, such as by handling client-specific key parameters in a configuration-driven mode using a config file that may be dynamically generated through a generative AI engine. This process eliminates the need for updating code, test scripts or huge metadata configs for any new client or changing API functionality. A generative AI engine analyzes a large corpus of data to predict patterns and rules for API requests and response validations. The generative AI engine may also generate synthetic data that exhibits characteristics learned from the real training data, upon which numerous and diverse test cases can be built. This may help in achieving a comprehensive test coverage for the create, read, update, and delete (CRUD) APIs of the application. The apparatus, by leveraging the power of generative AI, can intentionally create random, invalid, and/or distorted data, that may be used, for example, to detect security loopholes in an API-associated application, including exposure of sensitive data, and the like.

FBA may be used to certify the dynamic data and rules generation and also to facilitate parallel processing of thousands of test scripts, thus accelerating the overall process of validation using a hash data technique. Consensus achieved through FBA among different processes will significantly improve the reliability and accuracy of the validation system having multiple sources of dynamic data and rules. The dynamic API validation computing system may be a plug and play system that can be integrated with any portal and/or application requiring validation for associated APIs.

FIG. 1A shows an illustrative computing environment 100 for dynamic API testing and validation, in accordance with one or more arrangements. The computing environment 100 may comprise one or more devices (e.g., computer systems, communication devices, and the like). The computing environment 100 may comprise, for example, a dynamic API validation computing system 104, one or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing systems 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3$^{rd}$ Generation Partnership Project (3GPP) cellular protocol, a hypertext transfer protocol (HTTP), etc.). While FIG. 1A shows the dynamic API validation computing system 104 as being a separate computing system, the dynamic API validation computing system 104 may be integrated into one or more different computing systems, such as the application computing systems 108.

The dynamic API validation computing system 104 may comprise one or more computing devices and/or other computer components (e.g., processors, memories, communication interfaces) configured to perform one or more functions as described herein. Further details associated with the architecture of the dynamic API validation computing system 104 are described with reference to FIG. 1B.

The application computing systems 108 and/or the client computing systems 122 may comprise one or more computing devices and/or other computer components (e.g., processors, memories, communication interfaces). In addition, the application computing systems 108 and/or the client computing systems 122 may be configured to host, execute, and/or otherwise provide one or more enterprise applications. In some cases, the application computing systems 108 may host one or more services 109 configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services 109. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing systems 122 and/or the application computing systems 108 may comprise various servers and/or databases that store and/or otherwise maintain account information, such as financial account information including account balances, transaction history, account owner information, and/or other information. In addition, the client computing systems 122 and/or the application computing systems 108 may process and/or otherwise execute transactions on specific accounts based on commands and/or other information received from other computer systems comprising the computing environment 100. In some cases, one or more of the client computing systems 122 and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing systems 120 may integrate API calls to request data, initiate functionality, or otherwise communicate with the one or more application computing systems 108, such as via the services 109. For example, the services 109 may be configured to facilitate data communications (e.g., data gathering functions, data writing functions, and the like) between the client computing systems 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the dynamic API validation computing system 104. For example, the database(s) 116 may store API test data of one or more APIs to be tested, API test cases, generative AI training data sets, and the like. In an arrangement, the database(s) 116 may be used for other purposes as described herein. In some cases, the client computing systems 120 may write data or read data to the database(s) 116 via the services.

In one or more arrangements, the dynamic API validation computing system 104, the application computing systems 108, the client computing systems 122, the client computing systems 120, the user devices 110, and/or the other devices/systems in the computing environment 100 may be any type of computing device capable of receiving input via a user interface, and communicating the received input to one or more other computing devices in the computing environment 100. For example, the dynamic API validation computing system 104, the application computing systems 108, the client computing systems 122, the client computing systems 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the dynamic API validation computing system 104, the application computing systems 108, the client computing systems 122, the client computing systems 120, the user devices 110, and/or the other devices/systems in the computing environment 100 may, in some instances, be and/or comprise special-purpose computing devices configured to perform specific functions.

Figure 1B:
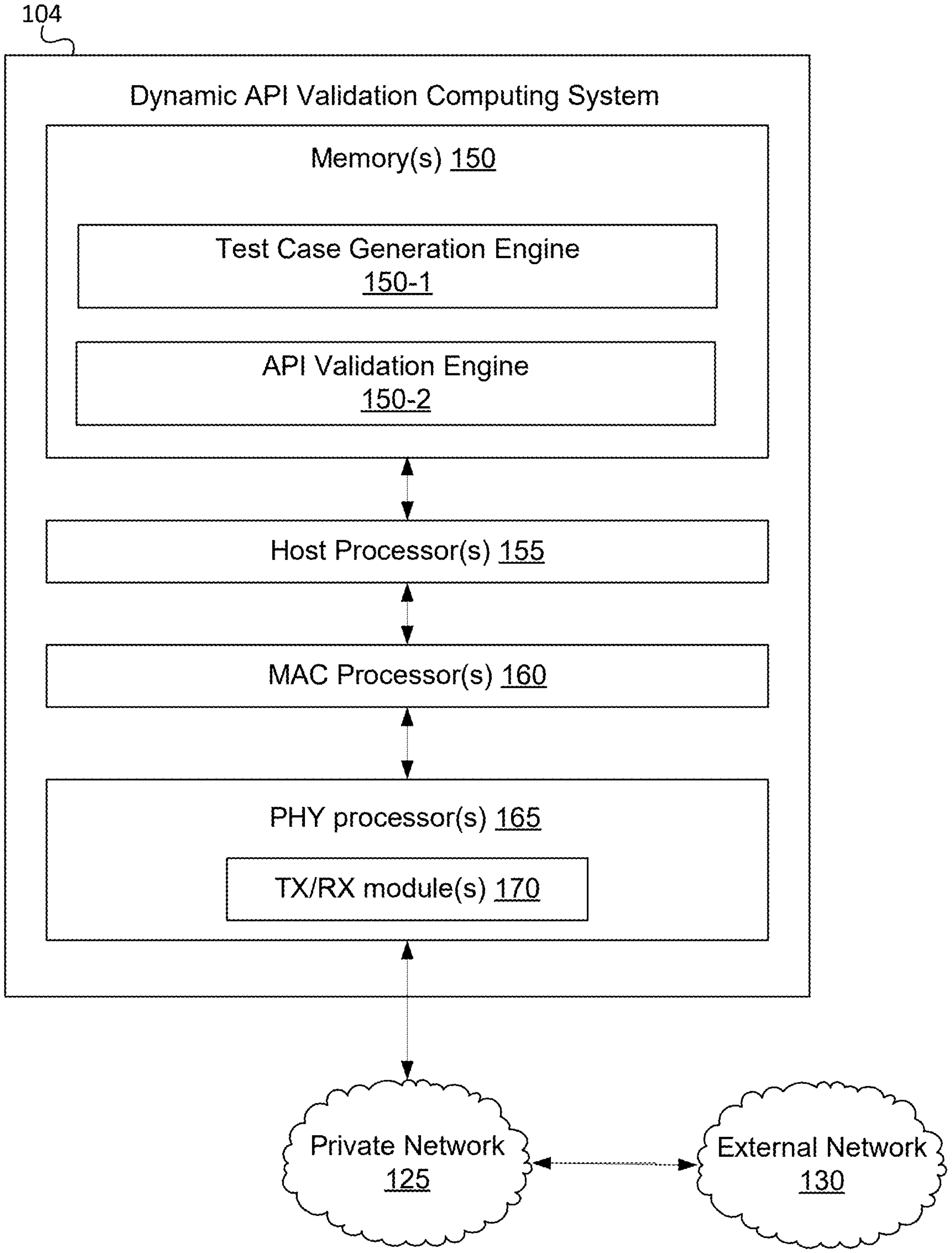
FIG. 1B shows an illustrative computing platform enabled for dynamic generation of API test cases and test data and performance of validation testing, in accordance with one or more aspects described herein.

FIG. 1B shows an illustrative dynamic API validation computing system 104 in accordance with one or more examples described herein. The dynamic API validation computing system 104 may be a stand-alone device and/or may at least be partial integrated with the dynamic API validation computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The dynamic API validation computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the dynamic API validation computing system 104 may be configured to generate data units, and process received data units, that conform to any suitable wired and/or wireless communication protocol. For example, the MAC processor (s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the dynamic API validation computing system 104 may be configured to execute machine readable instructions stored in memory 150. The memory 150 may comprise (i) one or more program modules/engines having instructions that when executed by the one or more processors cause the dynamic API validation computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the dynamic API validation computing system 104 and/or by different computing devices that may form and/or otherwise make up the dynamic API validation computing system 104. For example, the memory 150 may have, store, and/or comprise a test case generation engine 150-1, an API validation engine 150-2, and/or the like. The test case generation engine 150-1 may have instructions that direct and/or cause the dynamic API validation computing system 104 to perform one or more operations associated with automatic generation of a plurality of test cases and multiple combination of test data, intentionally invalid test data for use to identify security and/or operational flaws, and the like. The API validation engine 150-2 may have instructions that may cause the dynamic API validation computing system 104 to perform tests of API functions, such as to identify correct and secure operation of each of a plurality of APIs.

While FIG. 1A illustrates the dynamic API validation computing system 104, the dynamic API validation computing system 104, and/or the application computing systems 108, as being separate elements connected in the private network 125, in one or more other arrangements, functions of one or more of the above may be integrated in a single device/network of devices. For example, elements in the dynamic API validation computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
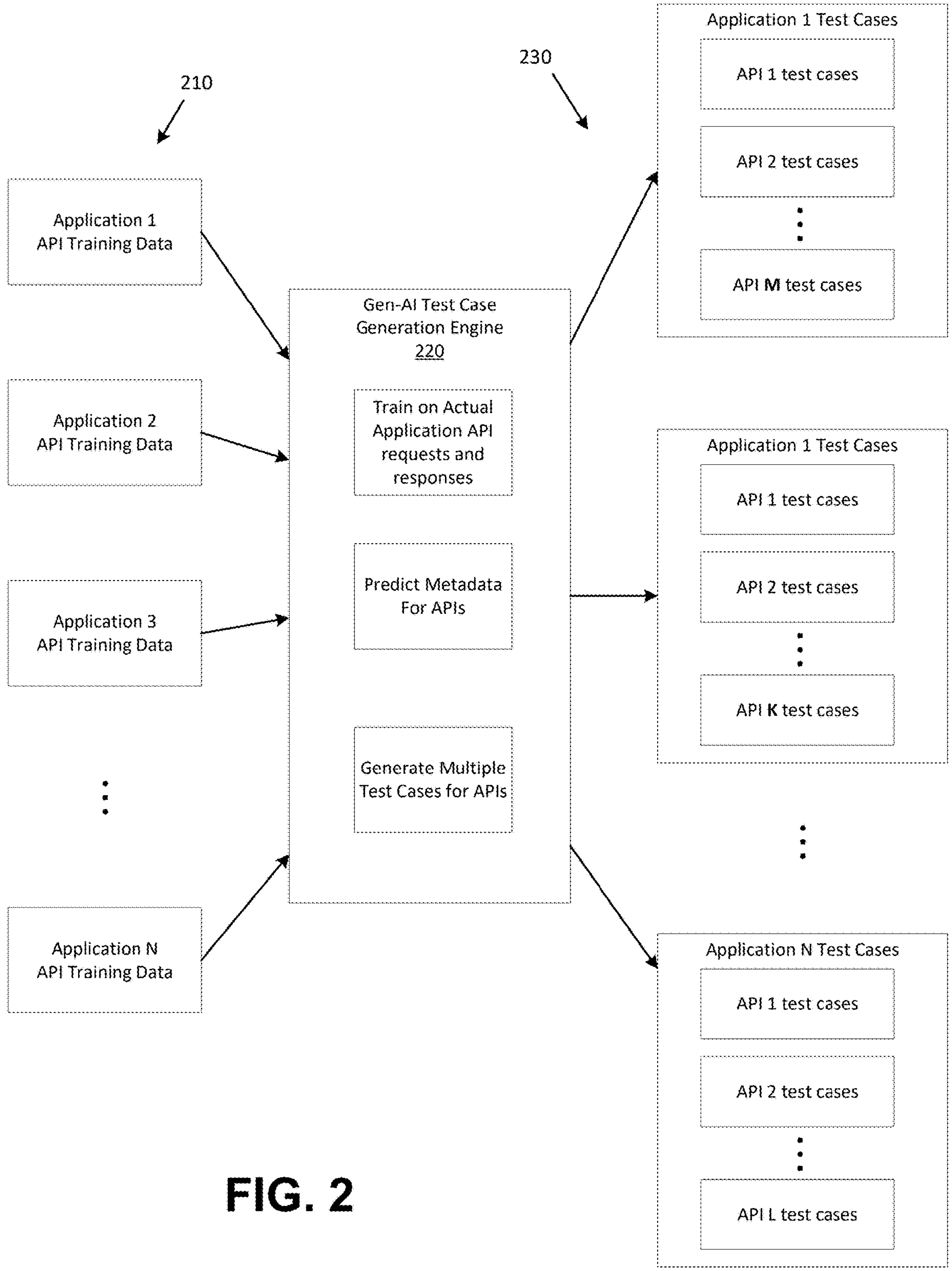
FIG. 2 shows an illustrative block diagram for dynamically generating API test cases in accordance with one or more aspects described herein.

FIG. 2 shows an illustrative block diagram for dynamically generating API test cases in accordance with one or more aspects described herein. API training data 210 may be collected and/or monitored in real-time from a plurality of APIs associated with one or more different applications. In some cases, the API training data may be stored information reflecting historical use of the API including development testing information, historical records of use of the API, and the like. The API training data 210 may further include historical records of errors encountered during use, including security loopholes, failures, and the like. In some cases, the API training data 210 may further include real-time monitoring of API use by one or more applications to capture additional changes to the API over time and/or errors, bug fixes and the like. The API training data 210 may further be scrubbed to remove instances of private or non-public customer information before being used to train a generative AI test case generation engine 220 to ensure data privacy.

The generative AI test case generation engine 220 may capture or otherwise use the application training data to continuously train a generative AI model for generating test cases and/or test data to be used when testing each of the plurality of application programming interfaces. For example, the generative AI test case generation engine 220 may receive via a plurality of interfaces, the API training data 210 for each API to be tested. Once received, the generative AI test case generation engine 220 may train on the actual API request and response information, such as by using historical information and real-time use information. The generative AI test case generation engine 220 may further predict metadata associated with each of the APIs based on the training data set and the actual request and response information. Based on that information, the generative AI test case generation engine 220 may generate multiple API test cases 230 for each API and/or for each application associated with each particular API. The generative AI test case generation engine 220 may then store the API test cases 230 in a data store for further use when validating API operation. As shown in FIG. 2, each application may have multiple API test cases 230 associated with it for use when validating the API functionality during testing.

Figure 3:
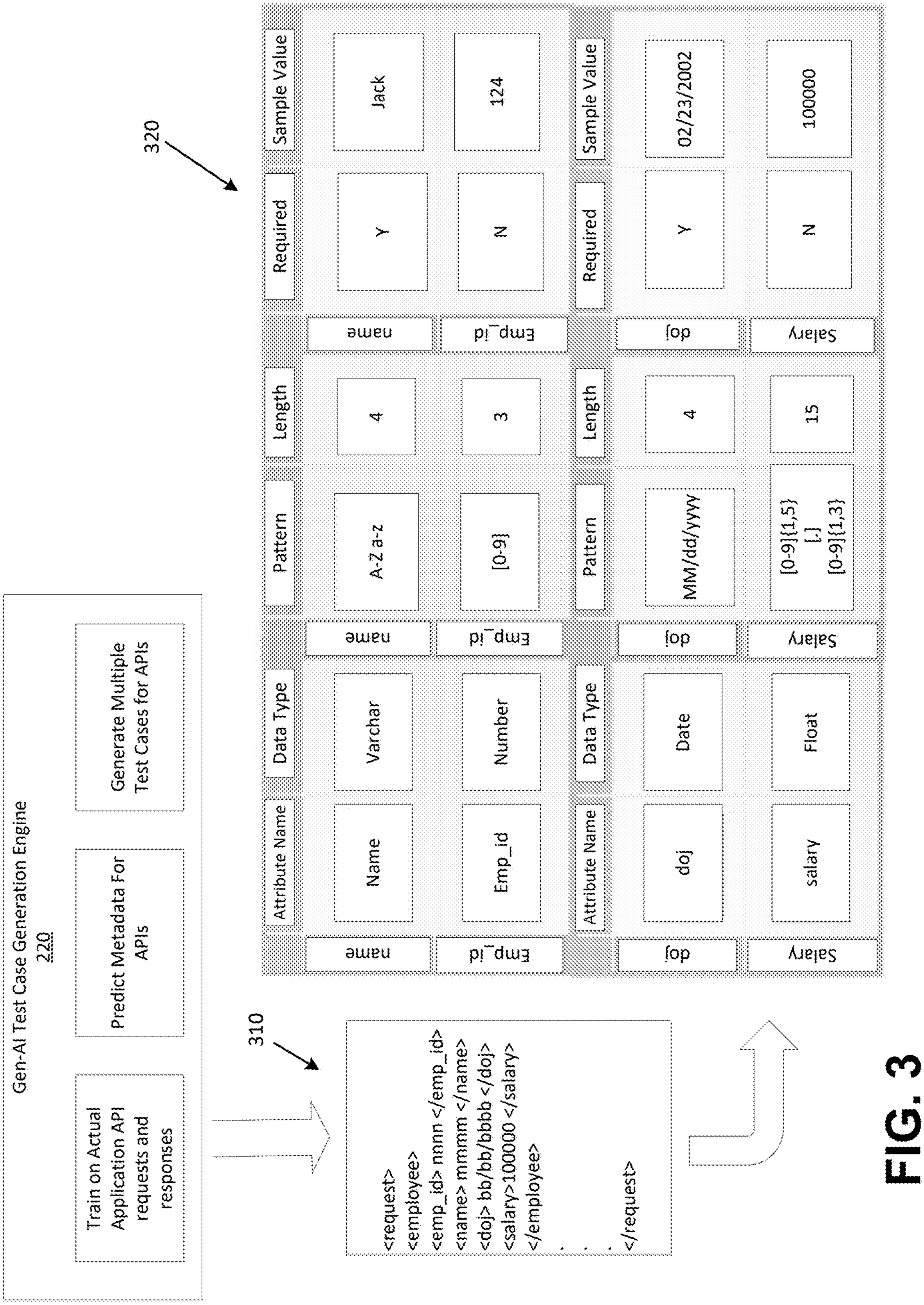
FIG. 3 show an illustrative process for dynamically generating API test data, in accordance with one or more aspects described herein.

Similarly, FIG. 3 show an illustrative process for dynamically generating API test data, based on the API training data 210. For example, the generative AI test case generation engine 220 may generate test data 320 for use when testing each particular API of a plurality of APIs, where the test data set 320 may be associated with every combination of metadata associated with the API to ensure that a complete test of API functionality is performed. The test data may have a structure 310 corresponding to use by the API, for example as data received by an API function request as inputs and/or as data communicated back to the requesting application as outputs in an API function response. The test data set 320 may include data to test proper API response functionality and/or intentionally faulty data to test the API response to error conditions and/or to expose potential security risks to trigger a test case failure so that any invalid handling of improper data can be caught and the potential security risks can be corrected.

Figure 4:
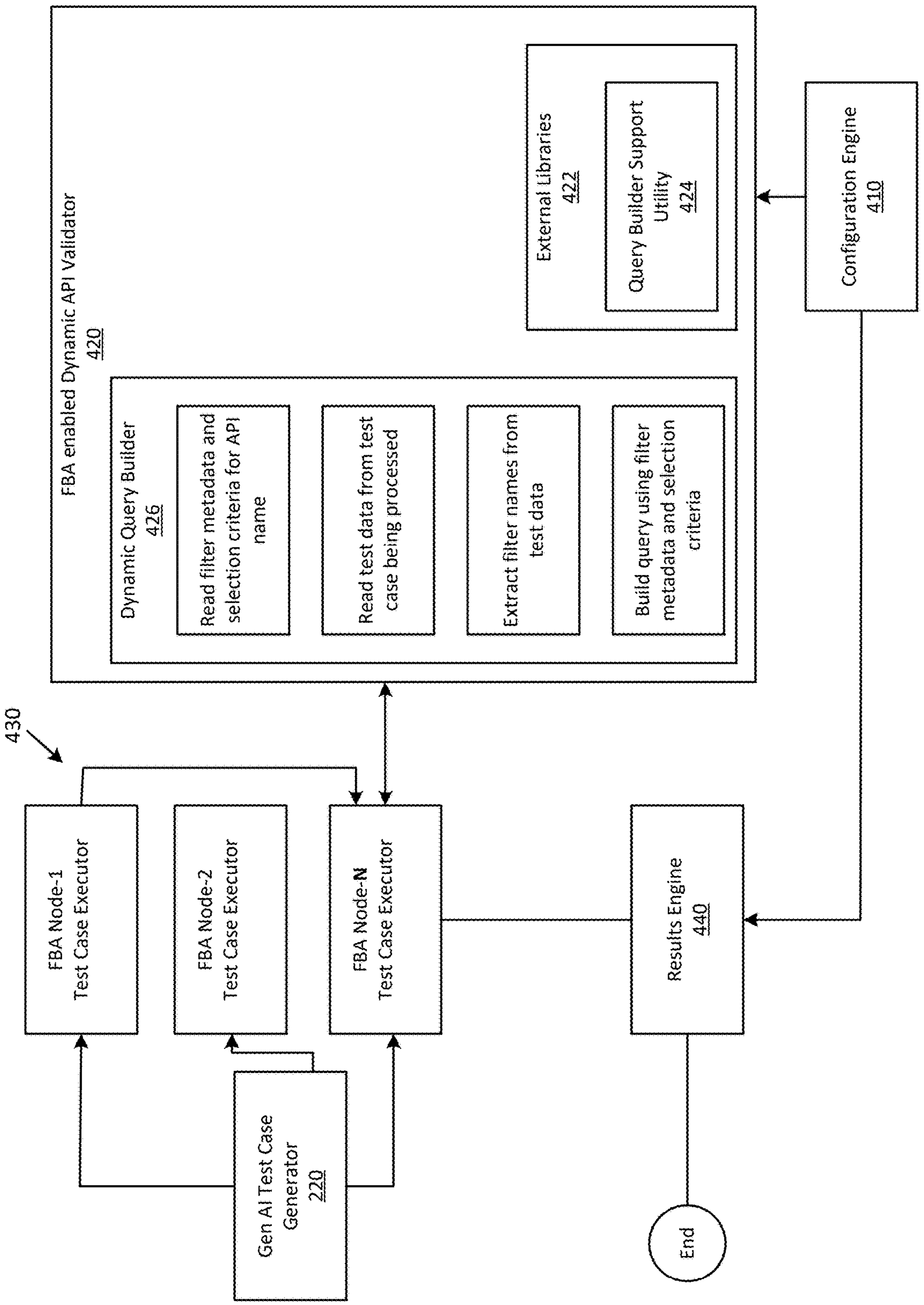
FIG. 4 shows an illustrative process for dynamic API validation through federated byzantine agreement in accordance with one or more aspects described herein

FIG. 4 shows an illustrative process for dynamic API validation through federated byzantine agreement (FBA) in accordance with one or more aspects described herein. A FBA enabled test system may include a configuration engine 410, and a FBA enabled dynamic API validator 420 that may include a dynamic query builder 426 and an external library interface 422, a plurality of FBA nodes 430, the generative AI test case generator 220, and a results engine 440.

The configuration engine 410 may process rules corresponding to the validation for the API data attributes and/or filters that may be configured for each test case filter present in a generative AI test case sheet (e.g., an API test case instance, an API test data set instance, and the like). The rules may store database table repository metadata for the filter, including, for example, database name, table name, column, joins, subqueries, table selection column, and the like that may be needed to extract data from the test data set database (e.g., database 116), such as by generating a query. The database results may be validated against the test case data and assertions can be performed. The configuration engine 410 may be highly configurable and extendable to provide flexibility to support testing of multiple APIs and to automatically adapt to changes made to API functionality without manually reprogramming the test case builder and/or manually restructuring the configuration of each API test.

The FBA enabled dynamic API validator 420 may read metadata and/or rules from the configuration file for each particular API of the plurality of APIs to be tested. The dynamic query builder 426 may read filter metadata and selection criteria for a particular API (e.g., based on an API name or other validator). Based on the filter metadata and selection criteria received from the configuration file, the FBA enabled dynamic API validator 420 reads test data from each test case being processed, extracts filter names from the test data, builds each query using the filter metadata and selection criteria, and utilizes a query builder support utility 424 to extract information from multiple external libraries. The test cases and/or test data generated by the generative AI test case generator 220 may be stored in a data repository to be accessed by each FBA test node, where each generated test case may utilize one or more combinations of filter data.

Each FBA test node of the plurality of FBA test nodes 430 may divide and perform parallel execution of a set of test cases on each FBA node from the huge generative AI generated test case data store. Each FBA node will execute different combinations of test cases, with different combinations of data sets to certify the API validation by reaching a consensus on the test case execution results using FBA methodology. Each test node may receive a request from the FBA enabled dynamic API validator 420, a call to the query builder to enable validation of API test results for each test case. The FBA enabled dynamic API validator 420 may then receive from the API test nodes an assertion query that the FBA enabled dynamic API validator 420 may use to compare the actual response received after the API execution of the test script. The results engine 440 may then compare test script results against data retrieved by execution of the assertion query to the FBA enabled dynamic API validator 420, where the results engine may fetch configuration information for use when analyzing the query results to determine whether the overall API test has passed or failed.

Figure 5:
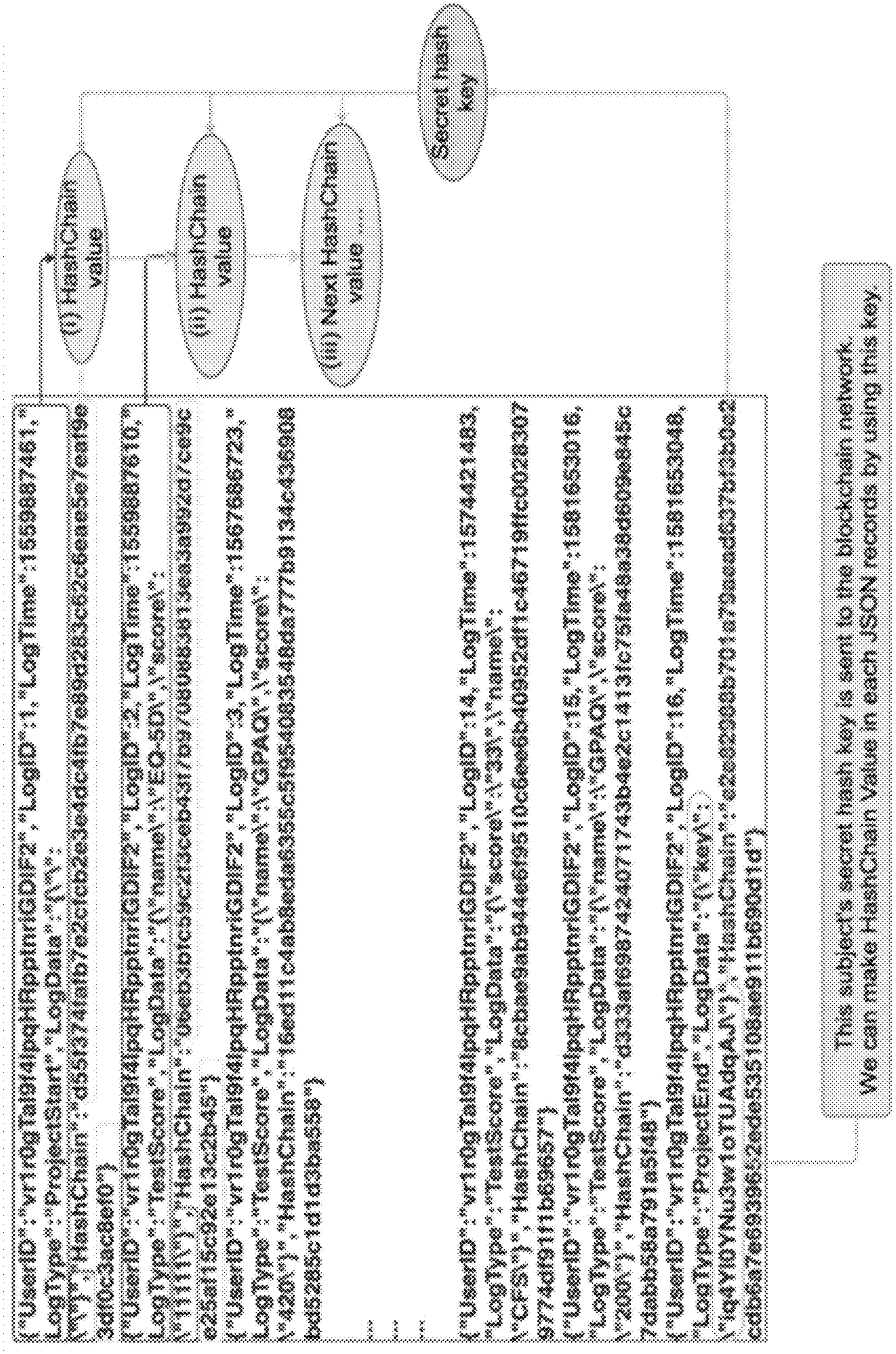
FIG. 5 shows illustrative federated byzantine agreement hash validation method in accordance with one or more aspects described herein.

FIG. 5 shows illustrative federated byzantine agreement hash validation method in accordance with one or more aspects described herein. By using an FBA system, each node does not have to be known and/or verified ahead of time so that control may be decentralized. Data nodes can choose particular trusted data validator channels. Further, system-wide quorums emerge from decisions made by individual node. To validate the integrity of the generated API test data, the FBA hash validation method may be used. The hash validation method assumes that actual data is stored separately from a blockchain, and then allows a data identifier and a hash of these data to be submitted to the blockchain. The actual data may be validated against the hash on the blockchain at any time. Several use cases are described elsewhere for blockchain-based hash validation, which may be used to validate an application audit trail and/or to validate the audit trail data. The illustrated example of FIG. 5 shows that blockchain-based hash validation is able to detect malicious and accidental changes that were made to the data. In some cases, based on a positive validation result returned, an application computing system may automatically initiate use of the validated API with an associated application, where the API may be a new API, updated API, and/or the like. In the result of a failed validation, a failure return to the application computing system may result in automatically pausing use of the API with an associated application, automatic reversion to a previously version of the API that has previously been validated and/or has been newly re-validated, and/or automatic initiation of use of a different API. In some cases, if a failure indicates a security threat with the API, an alert may be generated to pause operation of the application and/or the application programming interface and initiate a security recovery process based on a severity of the identified threat.

FIG. 6 shows illustrative training data and predictive output of a generative predictive model in accordance with one or more aspects described herein. FIG. 7 shows illustrative test case output of the generative predictive model in accordance with one or more aspects described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:

a application programming interface (API) validation platform comprising:

at least one processor; and memory storing computer-readable first instructions that, when executed by the at least one processor, cause the API validation platform to:

train, based on a training data set associated with a plurality of application programming interfaces (APIs), a generative artificial intelligence (Al) model;

predict by a test case generation platform, data patterns and validation rules for a first API of the plurality of APIs;

generate, by the trained generative Al model, a first plurality of test cases for the first API of the plurality of APIs;

initiate testing, by a plurality of test nodes, of the first plurality of test cases for the first API, wherein each test node of the plurality of test nodes executes different combinations of test cases with different combinations of test data sets;

determine, based on output of a consensus algorithm, agreement on the first plurality of test cases among the plurality of test nodes; and return a validation result based on the agreement on the first plurality of test cases; and an application computing system processing second instructions that cause the application computing system to, based on a validation of the first API, automatically initiate use of the first API by an associated first application.

2. The system of claim 1, wherein the first instructions further cause the API validation platform to monitor, in real time, requests and responses via one or more API interfaces.

3. The system of claim 1, wherein the first instructions further cause the API validation platform to predict a structure and format of an API request based on training model inputs, wherein the training model inputs comprise data corresponding to historical data processed by the first API.

4. The system of claim 1, wherein the testing of the first plurality of test cases for the first API comprises a federated byzantine agreement method.

5. The system of claim 1, wherein a dynamic API validation module validates results of the plurality of test cases based on a configuration file.

6. The system of claim 5, wherein the instructions cause the API validation module to generate test data as a table of attributes and values corresponding to possible combinations of data received as input to an API function.

7. The system of claim 6, wherein the test data includes intentionally erroneous data for test cases associated with data security of API functionality.

8. A method comprising:

training, based on a training data set associated with a plurality of application programming interfaces (APIs), a generative artificial intelligence (Al) model;

predicting by a test case generation platform, data patterns and validation rules for a first API of the plurality of APIs;

generating, by the trained generative Al model, a first plurality of test cases for the first API of the plurality of APIs;

initiating testing, by a plurality of test nodes, of the first plurality of test cases for the first API, wherein each test node of the plurality of test nodes executes different combinations of test cases with different combinations of test data sets;

determining, based on output of a consensus algorithm, agreement on the first plurality of test cases among the plurality of test nodes;

returning a validation result based on the agreement on the first plurality of test cases; and using, based on a validation of the first API and by an application computing system the first API by an associated first application.

9. The method of claim 8, further comprising monitoring, in real time, requests and responses via one or more API interfaces.

10. The method of claim 8, further comprising predicting a structure and format of an API request based on training model inputs, wherein the training model inputs comprise data corresponding to historical data processed by the first API.

11. The method of claim 8, wherein the testing of the first plurality of test cases for the first API comprises a federated byzantine agreement method.

12. The method of claim 8, wherein a dynamic API validation module validates results of the plurality of test cases based on a configuration file.

13. The method of claim 8, further comprising generating test data as a table of attributes and values corresponding to possible combinations of data received as input to an API function.

14. The method of claim 13, wherein the test data includes intentionally erroneous data for test cases associated with data security of API functionality.

15. Non-transitory computer readable media storing instructions that, when executed by a processor, cause an API validation platform to:

train, based on a training data set associated with a plurality of application programming interfaces (APIs), a generative artificial intelligence (Al) model;

predict by a test case generation platform, data patterns and validation rules for a first API of the plurality of APIs;

generate, by the trained generative Al model, a first plurality of test cases for the first API of the plurality of APIs;

initiate testing, by a plurality of test nodes, of the first plurality of test cases for the first API, wherein each test node of the plurality of test nodes executes different combinations of test cases with different combinations of test data sets;

determine, based on output of a consensus algorithm, agreement on the first plurality of test cases among the plurality of test nodes; and return a validation result based on the agreement on the first plurality of test cases.

16. The non-transitory computer readable media of claim 15, wherein the instructions further cause the API validation platform to monitor, in real time, requests and responses via one or more API interfaces.

17. The non-transitory computer readable media of claim 15, wherein the testing of the first plurality of test cases for the first API comprises a federated byzantine agreement method.

* * * * *